US012662127B1

(12) United States Patent
Chang et al.

(10) Patent No.: US 12,662,127 B1
(45) Date of Patent: Jun. 23, 2026

(54) LANE GROUP MODIFICATION AND GENERATION

(71) Applicant: Zoox, Inc., Foster City, CA (US)

(72) Inventors: Colby Glacier Chang, San Francisco, CA (US); Rasmus Fonseca, Boulder Creek, CA (US); Genie Kim, San Francisco, CA (US); Glen Thomas Neville, Medford, MA (US)

(73) Assignee: Zoox, Inc., Foster City, CA (US)

( * ) Notice: Subject to any disclaimer, the term of this patent is extended or adjusted under 35 U.S.C. 154(b) by 83 days.

(21) Appl. No.: 18/758,168

(22) Filed: Jun. 28, 2024

(51) Int. Cl.
*B60W 30/18* (2012.01)
*B60W 40/06* (2012.01)
*B60W 60/00* (2020.01)

(52) U.S. Cl.
CPC ...... *B60W 30/18163* (2013.01); *B60W 40/06* (2013.01); *B60W 60/001* (2020.02); *B60W 2552/53* (2020.02); *B60W 2554/80* (2020.02)

(58) Field of Classification Search
CPC .......... B60W 30/18163; B60W 40/06; B60W 60/001; B60W 2552/53; B60W 2554/80; G05D 1/00; G08G 1/00; G01C 21/00; G06V 20/58
See application file for complete search history.

(56) References Cited

U.S. PATENT DOCUMENTS 7,711,485 B2 * 5/2010 Matsumoto ............ G01C 21/26
                                                382/104
9,227,632 B1 * 1/2016 Lee ................... B60W 30/0956

10,649,459 B2    5/2020 Wang et al.
11,749,116 B1 * 9/2023 Young .................... G08G 1/096816
                                                340/932.2
11,987,261 B2 * 5/2024 Brown ............. G08G 1/096816
12,013,256 B1 * 6/2024 Kaplan .............. G01C 21/3848
12,187,293 B1 * 1/2025 Semple ................. B60W 30/08
12,280,783 B2 * 4/2025 Woodbury ...... B60W 30/18163
12,330,682 B2 * 6/2025 Willoughby .... B60W 60/00184
12,374,100 B2 * 7/2025 Yazdani ................. G06V 10/87
                    (Continued)

FOREIGN PATENT DOCUMENTS

CN        114003026 A  *  2/2022  ........... G05D 1/0214
WO    WO-2024215337 A1 * 10/2024  ........... G06V 20/588

OTHER PUBLICATIONS

CN-114003026-A machine translation (Year: 2022).*

(Continued)

*Primary Examiner* — Angelina M Shudy
(74) *Attorney, Agent, or Firm* — Lee & Hayes, P.C.

(57) ABSTRACT

Techniques for changing driving lanes due to construction zones are described herein. A vehicle may receive sensor data and determine, based on the sensor data, that the vehicle is approaching a construction zone. The vehicle may determine that the construction zone is blocking the driving lane occupied by the vehicle. In this case, the vehicle can generate a driving corridor that represents a driving lane within which the vehicle can navigate. The vehicle can use the driving corridor to generate a first lane group that is specific to navigating around the construction zone. Further, the vehicle can generate a second lane group based on map data. The vehicle can generate an updated lane group by combining the first lane group with the second lane group. The vehicle can be controlled based on the updated lane group.

20 Claims, 6 Drawing Sheets

(56)         References Cited

U.S. PATENT DOCUMENTS

| | | | |
|---|---|---|---|
| 12,397,821 B2* | 8/2025 | Yeh | G06V 10/82 |
| 2010/0324797 A1* | 12/2010 | Fritz | B60W 10/06 |
| | | | 701/1 |
| 2013/0231830 A1* | 9/2013 | Van Dan Elzen | B60W 50/14 |
| | | | 701/41 |
| 2014/0074356 A1* | 3/2014 | Bone | G08G 1/167 |
| | | | 701/41 |
| 2014/0200801 A1* | 7/2014 | Tsuruta | B60W 60/001 |
| | | | 701/400 |
| 2014/0257686 A1* | 9/2014 | Feldman | B60W 30/18163 |
| | | | 701/300 |
| 2015/0066349 A1* | 3/2015 | Chan | G01C 21/3697 |
| | | | 701/400 |
| 2015/0345964 A1* | 12/2015 | Oooka | B60W 30/143 |
| | | | 701/41 |
| 2018/0238696 A1* | 8/2018 | Takeda | G08G 1/16 |
| 2018/0252539 A1* | 9/2018 | Yunoki | B60W 30/10 |
| 2019/0011912 A1* | 1/2019 | Lockwood | G05D 1/0231 |
| 2019/0118809 A1* | 4/2019 | Niino | B60T 8/17558 |
| 2019/0258260 A1* | 8/2019 | Sunil Kumar | G05D 1/024 |
| 2019/0283752 A1* | 9/2019 | Yanagihara | B60W 30/181 |
| 2019/0286149 A1* | 9/2019 | Miura | G06V 20/56 |
| 2019/0384293 A1* | 12/2019 | Yoo | B60W 30/16 |
| 2020/0172106 A1* | 6/2020 | O'Dea | B60W 30/18163 |
| 2020/0198633 A1* | 6/2020 | Fujimaki | B60W 30/18163 |
| 2020/0216085 A1* | 7/2020 | Bobier-Tiu | B60W 40/08 |
| 2020/0279488 A1* | 9/2020 | Shibasaki | G08G 1/167 |
| 2020/0391731 A1* | 12/2020 | Cheon | B60W 10/18 |
| 2020/0393261 A1* | 12/2020 | Zhang | G01C 21/3492 |
| 2020/0398833 A1* | 12/2020 | Hudecek | B60W 60/001 |
| 2021/0009133 A1* | 1/2021 | Mcnew | B60W 40/09 |
| 2021/0020031 A1* | 1/2021 | Herman | G08G 1/162 |
| 2021/0031760 A1* | 2/2021 | Ostafew | B60W 30/09 |
| 2021/0056853 A1* | 2/2021 | Caldwell | G06V 20/588 |
| 2021/0108936 A1* | 4/2021 | Seegmiller | B60W 60/00276 |
| 2021/0114617 A1* | 4/2021 | Phillips | G01C 21/3453 |
| 2021/0181750 A1* | 6/2021 | Gogna | G08G 1/167 |
| 2021/0192956 A1* | 6/2021 | Takeda | G08G 1/167 |
| 2021/0199444 A1* | 7/2021 | Xie | G01C 21/32 |
| 2021/0316733 A1* | 10/2021 | Mizoguchi | B60W 30/146 |
| 2021/0347382 A1* | 11/2021 | Huang | G05D 1/0212 |
| 2022/0009492 A1* | 1/2022 | Adwan | B60W 40/105 |
| 2022/0126863 A1* | 4/2022 | Moustafa | B60W 40/09 |
| 2022/0185266 A1* | 6/2022 | Shah | B60W 30/0956 |
| 2022/0274625 A1* | 9/2022 | Garimella | G06N 3/044 |
| 2022/0290997 A1* | 9/2022 | Cserna | G01C 21/32 |
| 2022/0315003 A1* | 10/2022 | Hong | B62D 15/0255 |
| 2023/0008285 A1* | 1/2023 | Ma | G06F 16/9027 |
| 2023/0078779 A1* | 3/2023 | Eng | B60W 50/0097 |
| | | | 701/117 |
| 2023/0104951 A1* | 4/2023 | Wakabayashi | B60W 40/04 |
| | | | 701/41 |
| 2023/0177963 A1* | 6/2023 | Joo | G08G 1/096716 |
| | | | 701/301 |
| 2023/0182726 A1* | 6/2023 | Nishiura | B60W 30/0956 |
| | | | 701/26 |
| 2023/0311888 A1* | 10/2023 | Kato | G06V 20/58 |
| | | | 701/41 |
| 2023/0339470 A1* | 10/2023 | Hay | B60W 30/0956 |
| 2023/0419830 A1 | 12/2023 | Crane et al. | |
| 2024/0201700 A1* | 6/2024 | Yan | G05D 1/2297 |
| 2024/0336281 A1* | 10/2024 | Jafari | G06V 20/588 |
| 2024/0391488 A1* | 11/2024 | Yeh | G06V 20/56 |
| 2025/0058781 A1* | 2/2025 | Shoemaker | B60W 60/001 |
| 2025/0061728 A1* | 2/2025 | Saggu | G06V 10/82 |
| 2025/0104269 A1* | 3/2025 | Schaefer | G06V 20/588 |
| 2025/0214609 A1* | 7/2025 | Wray | G01C 21/3461 |
| 2025/0276714 A1* | 9/2025 | Ainampudi | B60W 60/001 |
| 2025/0354817 A1* | 11/2025 | Ulutan | G01C 21/3415 |

OTHER PUBLICATIONS

U.S. Appl. No. 17/931,652, filed Sep. 13, 2022, Ma, et al., "Systems and Methods for Construction Zone Detection", 55 pages.

U.S. Appl. No. 18/667,912, filed May 21, 2024, Ulutan, et al., "Dynamic Lane Determination", 60 pages.

* cited by examiner

300

LANE GROUP BASED ON MAP DATA 404

LANE GROUP BASED ON DRIVING CORRIDOR 402

UPDATED LANE GROUP 406

400

600 ⟍

LANE GROUP MODIFICATION AND GENERATION

BACKGROUND

Vehicles, such as autonomous vehicles, may navigate along designated routes. In some examples, the vehicles may encounter areas, such as construction zones or other regions which have been cordoned off for driving, that block some or all driving lanes along the designated route. Based on identifying the area, the vehicle may determine trajectories to follow that avoid the area and proceed to the destination. However, in certain circumstances, techniques for navigating around such areas can result in selection of trajectories which may be suboptimal and/or may slow or stop traffic.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
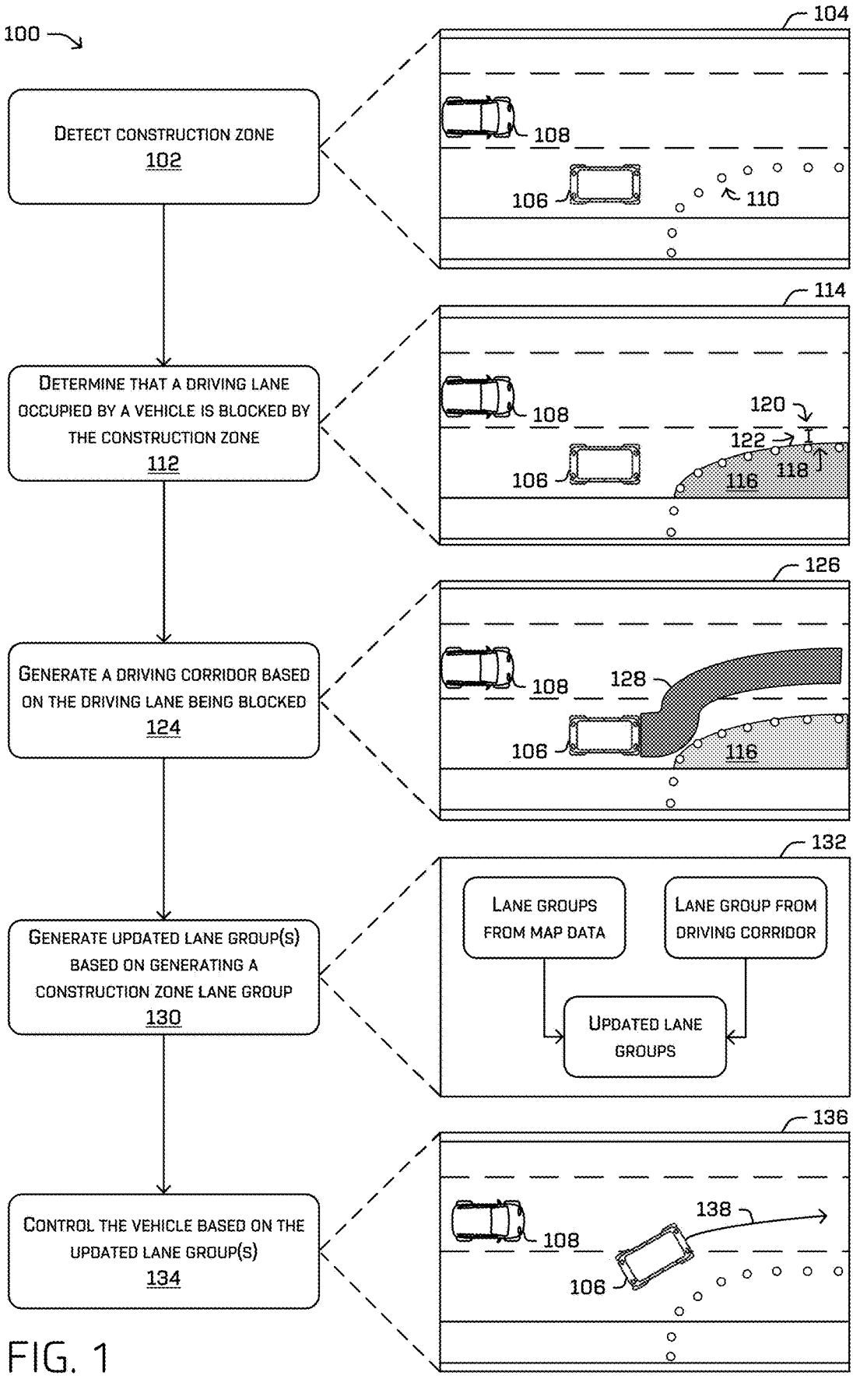
FIG. 1 is a pictorial flow diagram illustrating an example technique for generating restricted area lane groups and controlling a vehicle based on such lane groups, in accordance with one or more examples of the disclosure.

Techniques for changing driving lanes due to restricted areas are described herein. In some examples, a vehicle (such as an autonomous vehicle) may receive sensor data and determine, based on the sensor data, that the vehicle is approaching a construction zone. In such cases, the vehicle may determine whether the construction zone is blocking the driving lane occupied by the vehicle. Based on the driving lane being blocked by the construction zone, the vehicle can modify the representation of the driving lanes such that a planning component of the vehicle uses a forced merge (e.g., two driving lanes combining into a single driving lane) technique rather than a nominal lane change technique when determining which action to follow. For example, the vehicle may generate a driving corridor (e.g., polygon, bounded region, etc.) that represents a driving lane within which the vehicle can navigate. The vehicle can use the driving corridor to generate a first lane group (e.g., a series of connected lane segments that do not require lane changes) that is specific to navigating around the construction zone.

Further, the vehicle can generate a second lane group based on map data. The vehicle can generate an updated lane group by combining the first lane group with the second lane group. In such cases, the vehicle can be controlled based on the updated lane group. As described in more detail below, the techniques described herein may improve vehicle safety and driving efficiency by allowing the vehicle to modify the way in which the vehicle navigates around the construction zone, thereby resulting in the vehicle generating more efficient and accurate trajectories.

When navigating through an environment, it may be beneficial to consider the impacts of construction zones on the right-of-way (hereinafter referred to as ROW) of a vehicle or other object within a driving environment. For example, while navigating an environment, a vehicle may rely on map data to understand road geometries, driving lane relationships, junction (or intersection) relationships, object types and/or locations, vehicle location, ROW, etc. As such, accurate map data may be important to the safe travels of the vehicle. Specifically, when the vehicle is planning a lane change maneuver, the vehicle may rely on the map data to determine a ROW score corresponding to the vehicle and/or to other object(s) in the target driving lane. Such ROW scores may increase the vehicle's ability to perform safe lane changing maneuvers that respect the ROW of objects in the target driving lane. However, in some circumstances, changes in the environment may render the map data inaccurate. For example, a section of the route may become under construction which may not be reflected in the map data. In this example, the construction zone may cause the relationship between the driving lanes, junctions, etc. to change since construction zone may remove driving lane(s) and/or combined other driving lanes. Accordingly, when determining which trajectories to follow through the construction zone, the vehicle may lack an accurate understanding of the road network which may result in the vehicle calculating inaccurate ROW scores for the vehicle and for the object(s) in the target driving lane which may result in the vehicle performing overly cautious actions that slow and/or stop traffic.

For example, a vehicle may approach a construction zone that is blocking the driving lane within which the vehicle is located. As such, the vehicle is forced to change driving lanes to a driving lane spaced laterally to one side or the other of the current driving lane. In this example, the target driving lane may include an object that is longitudinally behind the vehicle. Accordingly, due to the map data failing to indicate the presence of the construction zone, the vehicle may use nominal lane change techniques to determine ROW scores rather than forced merge techniques. However, in such cases, the object may notice that the vehicle is forced to merge into the target driving lane and as such, the object may be more willing to let the vehicle enter the target driving lane than it would be during a nominal lane change maneuver. Consequently, when using the nominal lane change techniques, the vehicle may determine that the lane change to the target driving lane may be unsafe since the object has a high ROW score and the longitudinal distance between vehicle and the object is limited. As such, the vehicle may be overly cautious by slowing down and letting the object pass the vehicle prior to changing driving lanes. As such, the techniques and systems described herein may allow the vehicle to identify construction zones and cause the planning components to use forced merge techniques (based on construction zone lane groups) rather than nominal lane changing techniques when determining the ROW scores.

To address these and other technical problems and inefficiencies, the systems and/or techniques described herein include a planning component (which also may be referred to as a "planning system" or "planner component") configured to generate lane groups that can be used to modify the way in which the planning component determines ROW scores for the vehicle and/or object(s) proximate the vehicle. Technical solutions discussed herein solve one or more technical problems associated with conventional techniques resulting in suboptimal driving maneuvers that slow or stop traffic.

In some examples, the vehicle may receive sensor data from one or more sensor devices while traversing an environment. In some examples, the vehicle may include multiple sensor devices (e.g., lidar device(s), radar device(s), time-of-flight device(s), image capturing device(s), infrared device(s), etc.) configured to receive sensor data of the environment. Such sensor devices may be located at any location on or in the vehicle and may capture sensor data of any portion of the environment. In some examples, each sensor device may provide unique sensor data representative of the perspective of the particular sensor.

In some examples, the vehicle may detect a construction zone (or restricted area) based on the sensor data. That is, in some situations, portions of a driving route may be undergoing construction. Such regions of the environment may be referred to as a construction zone. In some examples, the vehicle may identify a construction zone based on detecting construction cones, construction workers (e.g., pedestrians wearing certain types of clothing, pedestrians holding up traffic signs, etc.), etc. Non-limiting example techniques for detecting construction zones can be found, for example, in U.S. application Ser. No. 17/931,652, filed Sep. 13, 2022, and titled "Systems and Methods for Construction Zone Detection," the contents of which is herein incorporated herein by reference in its entirety and for all purposes. In some examples, the vehicle may determine that the vehicle is approaching the construction zone based on the construction zone overlapping with a designated route, candidate trajectory, planned path, preferred path, etc.

Based on detecting the construction zone, the vehicle may determine whether the construction zone is blocking the driving lane currently occupied (or predicted to occupy at a future time) by the vehicle. That is, the vehicle may determine if the driving lane occupied by the vehicle is associated with a portion that is restricted for driving (e.g., blocked by a construction zone). A construction zone may be blocking the driving lane if the vehicle is forced to change lanes to navigate around the construction zone. For example, the vehicle may generate, determine, or receive a construction zone contour which may be a bounded region that encompasses (or outlines) the construction zone. That is, the construction zone contour may define a region of the environment that is predicted to be associated with the construction zone. The vehicle can generate the construction zone contour by inputting the sensor data and/or map data into a machine-learned model trained to output the construction zone contour. For instance, the border of the construction zone contour may follow the construction cones located within the environment.

Based on generating the construction zone contour, the vehicle may determine whether the vehicle can pass on the left or right of the construction zone contour while staying in the current driving lane. That is, the current driving lane of the vehicle may be blocked if the vehicle is unable to navigate in the driving lane without entering a laterally adjacent driving lane. In contrast, the current driving lane of the vehicle may not be blocked if the vehicle is able to navigate in the driving lane without entering a laterally adjacent driving lane. In some examples, the planning component can determine if the vehicle can pass the construction zone by determining if a width of the vehicle meets or exceeds a distance from a side of the construction zone contour to a lane marker dividing the driving lanes. That is, the vehicle may identify a side of the construction zone contour within the driving lane, a lane marker of the current driving lane, and determine a distance between the side and the lane marker. Based on determining the distance, the vehicle can determine if the width of the vehicle is small enough such that the vehicle can fit (or otherwise navigate) within the current driving lane without entering a laterally adjacent driving lane.

Based on the driving lane being blocked by the construction zone, the vehicle can receive a drive space contour. A drive space contour may be a polygon, a bounded region, or a geometric region. The drive space contour may represent a region of the environment available for the vehicle to traverse to avoid the construction zone. In some examples, the vehicle may generate the drive space contour using a machine-learned model that is trained to output the drive space contour. In some examples, the vehicle can generate multiple drive space contours. For example, if a center driving lane is blocked by a construction zone, the vehicle may generate a first drive space contour that enters the left laterally adjacent driving lane and a second drive space contour that enters the right laterally adjacent driving lane. Non-limiting example techniques for generating the drive space contour can be found, for example, in U.S. application Ser. No. 18/667,879, filed May 21, 2024, and titled "Dynamic Drivable Area Determining Management" and U.S. application Ser. No. 18/667,912, filed May 21, 2024, and titled "Dynamic Parking Location Determining Management," the contents of which are incorporated herein by reference in their entirety and for all purposes. In some examples, the vehicle may select or determine which of the multiple drive space contours to use or follow based on one or more costs associated therewith.

In some examples, the vehicle can determine a drive space corridor by refining (or smoothing) the drive space contour. That is, in some instances, the driving space contour may be too large or too small. As such, the vehicle can refine the drive space contour by smoothing the borders such that the modified drive space contour (e.g., drive space corridor) is similar in width to a driving lane. The vehicle may generate the drive space corridor by identifying a side of the drive space contour and/or determining an offset distance from the side that is the width of the vehicle (plus a buffer). In such cases, the vehicle can generate a new side at the offset distance and use the new side and the initial side to create the drive space corridor.

In some examples, the vehicle can generate lane groups (or paths) based on the drive space corridor and/or map data. A lane group (or path) may be a series of connected lane segments that do not require a lane change. That is, a vehicle may generate lane groups (e.g., groups of lane segments) while the vehicle traverses the environment according to an operating tick of the planning component. An operating tick may be a frequency (e.g., 1 millisecond, 5 milliseconds, etc.) and/or duration of a processing cycle within the planning component. As such, in some examples, the planning component may generate lane groups at any other suitable frequency (e.g., every N number of ticks, where N is an integer greater than zero, based on movement of the vehicle, velocity of the vehicle, number of additional objects proximate the vehicle, difficulty of maneuvers, proximity to endpoint, etc.). In such examples, the planning component may associate the lane groups with a heatmap that may be analyzed when planning future actions of the vehicle.

In some cases, the vehicle may generate lane groups based on the map data. That is, the planning component may identify one or more lane groups (e.g., groups of lane segments that lack a lane change) within the map data. Based on identifying the lane groups, the planning component may associate the lane groups with a first heatmap.

Additionally, the vehicle may generate a lane group (or path) based on the drive space corridor. That is, since the map data may lack data representing the construction zone, the planning component may generate a lane group (or unstructured path) specific to the construction zone. For example, the planning component may generate a lane group that follows the drive space corridor around the construction zone. As such, the lane group based on the drive space corridor may include lane segments from multiple different driving lanes. However, in other examples, the lane group based on the drive corridor may lack or otherwise not include lane segments. That is, the lane group based on the drive corridor may be an unstructured lane group or path. In such cases, the lane group may extend from the location of the vehicle to an ending location of the construction zone. The planning component may convert or otherwise associate the lane group with a second heatmap that is different than the first heatmap as generated based on the map data.

Accordingly, the planning component may generate an updated or combined heatmap (or lane group) by combining the first heatmap (or lane groups based on map data) with the second heatmap (or lane group based on the drive corridor). In such cases, the updated heatmap or updated lane group may be a single heatmap or a single updated lane group that includes the lane groups from the map data and from the drive space corridor. Alternatively or additionally, the planning component may generate a single heatmap using lane group from the drive corridor and the lane groups from the map data. That is, the planning component may receive such lane groups, combine the lane groups into a single set of lane groups, and generate a single heatmap based on the single set of lane groups.

In some examples, the planning component can control the vehicle based on the updated heatmap (or the updated lane group). That is, the planning component may include one or more subcomponents that may use the updated heatmap to determine actions for the vehicle. Specifically, the updated heatmap may provide the planning component structured lane groups (from map data) and an unstructured lane group (from the driving corridor) which may cause the planning component to evaluate the driving scenario as a forced merge scenario rather than a traditional lane change scenario. In such cases, a ROW component of the planning component may use the updated heatmap when determining the ROW scores for the vehicle and/or objects proximate the vehicle. Non-limiting techniques for determining a ROW may be found, for example, in U.S. patent application Ser. No. 17/850,348 titled "Determining Right of Way," filed on Jun. 27, 2022, the entire contents of which are hereby incorporated herein by reference in its entirety and for all purposes. As such, when determining the ROW scores, the ROW component may view the scenario as two driving lanes merging to occupy the same physical space which may trigger the forced merge logic (or techniques). Further, when determining the ROW scores, the ROW component (or planning component) can modify the weights assigned to or otherwise associated with a specific lane group. That is, every lane group can have a type (e.g., construction zone, nominal, turning, etc.). As such, the ROW component can modify the weight of the construction zone lane group such that the weight is higher than the weight of the other types of lane groups. Increasing the weight of the construction zone lane group may increase the ROW score of the vehicle (e.g., indicate that the vehicle has higher ROW) and decrease the ROW score of the object in the laterally adjacent (or spaced) driving lane. Such a modification may encourage the vehicle to merge safely prior to the construction zone. That is, the ROW component may generate a single ROW score (e.g., representing the ROW of the object relative to the vehicle) that accounts for (or is based on) the weights of the lane groups.

The techniques described herein can improve the functioning, safety, and efficiency of the autonomous and semi-autonomous vehicles operating in various driving environments. Determining construction zone lane groups may enable the vehicle to consider the impacts of construction zones despite these construction zones not being represented in map data. Allowing the vehicle to modify the way in which the planning component evaluates construction zones by adding an unstructured lane (or path) may increase the flow of traffic which may increase safety from some or all objects proximate the construction zone.

The techniques described herein may be implemented in several ways. Example implementations are provided below with reference to the following figures. Although discussed in the context of an autonomous vehicle, the methods, apparatuses, and systems described herein may be applied to a variety of systems, and are not limited to autonomous vehicles. In another example, the techniques may be utilized in an aviation or nautical context, or in any other system. Additionally, the techniques described herein may be used with real data (e.g., captured using sensor(s)), simulated data (e.g., generated by a simulator), or any combination of the two.

FIG. 1 is a pictorial flow diagram illustrating an example process 100 for generating construction zone lane groups and controlling a vehicle based on such lane groups. As shown in this example, some or all of the operations in the example process 100 may be performed by a perception component, prediction component, a planning component, and/or any other component or systems within an autonomous vehicle. As described below in more detail, the planning component may include various components, such as a lane blocking component, a driving corridor component, a lane group generating component, and/or a trajectory determining component.

At operation 102, the planning component may detect a construction zone. In some examples, a vehicle may navigate an environment from a starting location to an ending location. While navigating the environment, the vehicle may use sensor devices to detect one or more objects in the environment. In some cases, the vehicle may detect object(s) that represent a construction zone. For example, box 104 illustrates a vehicle approaching a construction zone. In this example, the box 104 includes a vehicle 106 and an object 108. As shown, the object 108 may be a vehicle; however, in other examples, the object 108 may be any other type of dynamic object. In this example, the vehicle 106 may occupy a driving lane that is laterally adjacent to the driving lane occupied by the object 108. Further, the vehicle 106 may be longitudinally in front of the object 108.

As shown, box 104 may include construction cones 110 that may be representative of a border of a construction zone. That is, the vehicle 106 may capture sensor data and/or analyze such sensor data. The vehicle 106 may detect the construction cones 110 and determine that the vehicle 106 may be approaching a construction zone that is defined by the construction cones 110. However, this is not intended to be limiting; in this example the construction zone is indicated by the construction cones 110, however, in other examples, the construction zone may be identified based on various other factors (e.g., construction signage, construction personnel, etc.).

At operation 112, the planning component may determine that a driving lane occupied by a vehicle is blocked by the construction zone. A driving lane may be blocked if the vehicle 106 is forced to change driving lanes to navigate around the construction zone. To determine if the vehicle is forced to change driving lanes, the vehicle 106 may generate a construction zone contour and measure the distances from a side of the contour to a lane marker and determine if the vehicle 106 can fit within the driving lane. For example, box 114 illustrates a construction zone contour 116. As shown, the construction zone contour may represent a bounded or outlined region of the environment that corresponds to the construction zone. In this example, the planning component may identify a side 118 of the construction zone contour 116 that is within the driving lane and a lane marker 120 that divides the driving lanes. The planning component may determine a distance 122 between the side 118 and the lane marker 120 and determine whether the vehicle 106 is able to fit between the construction zone contour 116 and the lane marker 120. That is, the planning component may determine if the width of the vehicle 106 meets or exceeds the distance 122. If the width of the vehicle 106 meets or exceeds the distance 122, the planning component may determine that the vehicle 106 may be unable to navigate alongside the construction zone while remaining in the current driving lane and as such, the driving lane is blocked. In contrast, if the width of the vehicle 106 is less than the distance 122, the planning component may determine that the vehicle 106 may be able to navigate alongside the construction zone while remaining in the current driving lane and as such, the driving is not blocked. In this example, it can be appreciated that the width of the vehicle 106 meets or exceeds the distance 122 and as such, the driving lane occupied by the vehicle 106 is blocked by the construction zone.

At operation 124, the planning component may generate a driving corridor based on the driving lane being blocked. Due to the driving lane of the vehicle 106 being blocked by the construction zone, the vehicle 106 is forced to perform a lane change maneuver to the driving lane occupied by the object 108. In such situations, the map data of the vehicle 106 may lack an understanding of the construction zone and as such, the planning component may analyze the candidate actions (or trajectories) as nominal lane changes. However, in this case, the candidate actions are more accurately classified as a forced merge scenario. As such, to enable the planning component to analyze the candidate actions as a forced merge, the planning component may generate a driving corridor which may resemble a driving lane. For example, box 126 illustrates a driving corridor 128 that represents a region the vehicle 106 can follow to avoid the construction zone. As noted above, the driving corridor 128 may be generated by one or more machine-learned models trained to output driving corridors. In this example, the driving corridor 128 excludes the vehicle 106; however, in other examples, the driving corridor 128 may encompass the position of the vehicle 106.

At operation 130, the planning component may generate updated lane group(s) based on generating a construction zone lane group. That is, the planning component may generate two type so lane groups. The first type of lane group may be generated from the map data while the second type of lane group may be generated from the driving corridor 128. That is, the planning component may receive map data that includes a listing of the one or more lane segments in the environment. As such, the planning component may generate lane groups that are a series of connected lane segments without a lane change. However, since the driving corridor 128 spans multiple driving lanes, the lane group associated with the driving corridor 128 may include lane segments from multiple different driving lanes. Alternatively, the lane group associated with the driving corridor 128 may be an unstructured path that lacks lane segments. For example, box 132 illustrates generating updated lane groups. In this example, the box 132 includes three different boxes. The boxes include a box labeled lane groups from map data, lane groups from driving corridor, and updated lane groups. The planning component may combine the lane groups generated from the map data with the lane group generated from the driving corridor 128 to create the updated lane groups. As such, the updated lane groups may include the lane groups from both the map data and the driving corridor 128.

At operation 134, the planning component may control the vehicle based on the updated lane groups. In some examples, the planning component may generate one or more candidate actions for the vehicle 106 to follow. The planning component may generate a control trajectory for the vehicle 106 to follow based on evaluating these candidate actions. When analyzing the candidate actions, the planning component may utilize the updated lane groups which may include information associated with the construction zone. As such, the planning component may determine that the vehicle 106 is to perform a forced merge and as such, the planning component may use the forced merge techniques to evaluate the candidate actions. For example, box 136 illustrates the vehicle 106 following a control trajectory 138 that instructs the vehicle 106 to merge into the driving lane occupied by the object 108 at a position in front of the object 108.

Figure 2:
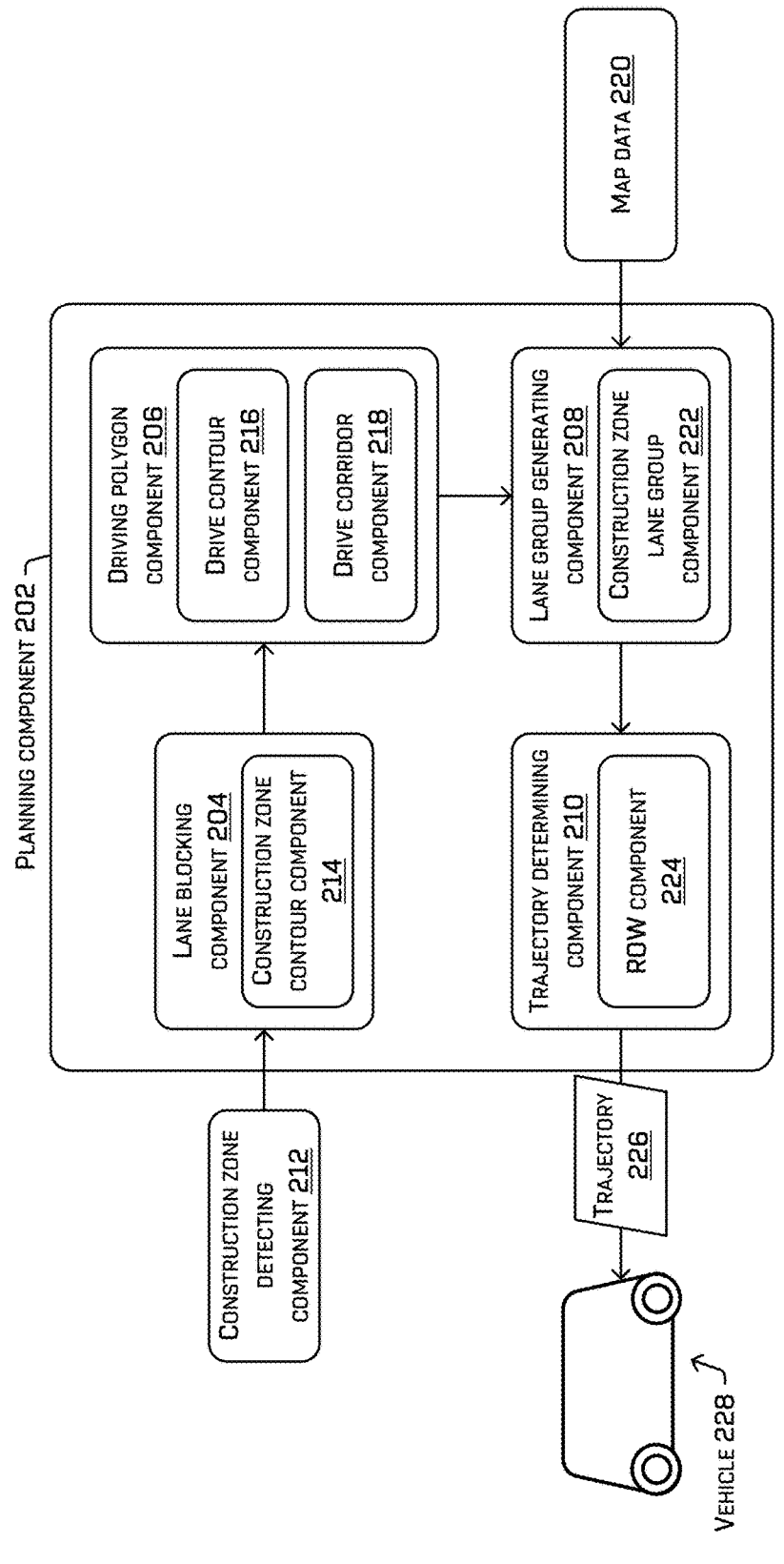
FIG. 2 illustrates an example computing system including a planning component configured to control a vehicle based on lane groups that represent the current driving environment, in accordance with one or more examples of the disclosure.

FIG. 2 illustrates an example computing system 200 including a planning component 202 configured to control a vehicle based on lane groups that represent the current driving environment.

In some examples, the planning component 202 may be similar or identical to the planning component described above, or in any other examples herein. As noted above, in some cases the planning component 202 may be implemented within an autonomous vehicle. In some examples, the planning component 202 may include various components, described below, configured to perform different functionalities of a technique to control a vehicle based on construction zone lane group(s). In some examples, the planning component 202 may include a lane blocking component 204 configured to determine whether a driving lane occupied by the vehicle is blocked by a construction zone, a driving polygon component 206 configured to generate a driving corridor based on the driving lane being blocked by the construction zone, a lane group generating component 208 configured to generate lane group(s), and/or a trajectory determining component 210 configured to determine a trajectory for the vehicle to follow based on the lane groups.

As shown, the planning component 202 may receive an indication of the presence of a construction zone proximate the vehicle from the construction zone detecting component 212. That is, the construction zone detecting component 212 may be configured to detect construction zones in the environment. In such examples, the construction zone detecting component 212 may receive sensor data of the environment. The sensor data may be captured by one or more sensor devices located in and/or on the vehicle. In such cases, the construction zone detecting component 212 may analyze the sensor data to detect the presence of a construction zone. As such, the construction zone detecting component 212 may send such an indication to the lane blocking component 204 of the planning component 202.

In some examples, the planning component 202 may include a lane blocking component 204 configured to determine whether a driving lane occupied by the vehicle is blocked by the construction zone. The lane blocking component 204 may receive an indication of the presence of the construction zone from the construction zone detecting component 212. As shown, the lane blocking component 204 may include a subcomponent called the construction zone contour component 214. The construction zone contour component 214 may be configured to generate a construction zone contour that outlines the construction zone. That is, the construction zone contour may be a geometric region of the environment that is predicted to be associated with the construction zone. Based on generating the construction zone contour, the lane blocking component 204 may be configured to determine if the vehicle may be able to navigate alongside the construction zone contour without changing driving lanes. That is, if the vehicle is forced to change driving lanes to avoid the driving lane contour, the lane blocking component 204 may determine that the driving lane is blocked by the construction zone. In contrast, if the vehicle is able to navigate alongside the construction zone contour while staying in the current driving lane, the lane blocking component 204 may determine that the driving lane is not blocked by the construction zone.

In some examples, the planning component 202 may include a driving polygon component 206 configured to generate a driving corridor based on the driving lane being blocked by the construction zone. As shown, the driving polygon component 206 may include one or more subcomponents called the drive contour component 216 and/or the drive corridor component 218. The drive contour component 216 may be configured to generate a drive space contour that represents a region of the environment that the vehicle may follow to navigate around the construction zone. In some examples, the drive space contour may encompass the vehicle; however, in other examples, the drive space corridor may exclude the vehicle. In some examples, the drive corridor component 218 may be configured to refine the drive space contour into the drive space corridor. The drive corridor component 218 may generate the drive space corridor by identifying a side of the drive space contour, determining an offset distance from the side that is the width of a vehicle or a driving lane, and/or generating a new side at the offset distance from the initial side. The newly created drive space corridor may be a refined polygon that is the width of a driving lane or of the vehicle. In some examples, the driving polygon component 206 may send the drive space corridor to the lane group generating component 208.

In some examples, the planning component 202 may include a lane group generating component 208 configured to generate lane group(s). As shown, the lane group generating component 208 may receive map data 220. The lane group generating component 208 may receive map data 220 of the region of the environment proximate the vehicle. In some examples, the lane group generating component 208 may receive the map data 220 from an external map server, and/or may store the map data 220 in an internal storage. For instance, the autonomous vehicle may request a receive map data 220 from a remote map server, based on the destination to which the vehicle is to travel, and store one or more maps locally on the vehicle. In some examples, map data 220 can include any number of data structures, modeled in two or more dimensions that are capable of providing information about the environment, such as, but not limited to, road network data, topologies, intersections (or junctions), streets, roads (or driving lanes), terrain, and the environment in general. The map data 220 may also represent various map features within the environment along the route, including but not limited to roads, lanes, lane segments, curbs, shoulders, crosswalks, buildings, medians, street signs, traffic signs, speed limits, etc. In some examples, the map data 220 may be sent to the lane group generating component 208. Though shown that the lane group generating component 208 receives the map data 220, in other examples any other component of the planning component 202 may receive the map data 220.

In some examples, the lane group generating component 208 may generate lane groups based on the map data 220. As noted above, a lane group may be a series of connected lane segments that do not require a lane change. As such, the lane group generating component 208 may identify the lane groups from within the map data 220 and convert the lane groups into a heatmap. In addition to the lane groups generated from the map data 220, the lane group generating component 208 may generate a lane group from the drive space corridor as generated by the driving polygon component 206. That is, the lane group generating component 208 may include a subcomponent called the construction zone lane group component 222 which may be configured to generate a construction zone lane group from the drive space corridor. In such cases, the construction zone lane group component 222 may use the map data 220 to identify the connecting lane segments within the drive space corridor. However, in some cases, the drive space corridor may span multiple driving lanes. As such, the construction zone lane group component 222 may generate the construction zone lane group to include lane segments from multiple driving lanes. Based on generating the map-based lane groups and the construction zone lane group, the lane group generating component 208 may generate an updated lane group (or an updated heatmap) by combining the map-based lane groups with the construction zone lane group. The lane group generating component 208 may send the updated lane group to the trajectory determining component 210.

In some examples, the planning component 202 may include a trajectory determining component 210 configured to determine a trajectory for the vehicle to follow based on the lane groups. As noted above, the trajectory determining component 210 may use the updated lane groups to control the vehicle. That is, the planning component 202 may generate one or more candidate actions for the vehicle to follow. To determine which of the candidate actions to follow, the trajectory determining component 210 may evaluate such candidate actions. One of the factors in evaluating the actions may include the ROW scores of the object(s) and/or of the vehicle based on the vehicle following the candidate action. In such cases, the ROW component 224 may be configured to generate ROW scores to associate with the object and/or with the vehicle. When determining the ROW scores, the ROW component 224 may analyze the candidate actions using the forced merge techniques. As such, the ROW component 224 may modify the weight of the construction zone lane group to be a higher value than the weight of the lane groups associated with the object. In such cases, the higher weight may increase the ROW score attributable to the vehicle which may encourage the trajectory determining component 210 to select a trajectory that performs the merge rather than slowing down and stopping traffic. As such, the trajectory determining component 210 may determine a trajectory 226 (e.g., control trajectory) between the one or more candidate actions. The trajectory determining component 210 may send the trajectory 226 to the vehicle 228 for the vehicle to follow throughout the environment.

Figure 3:
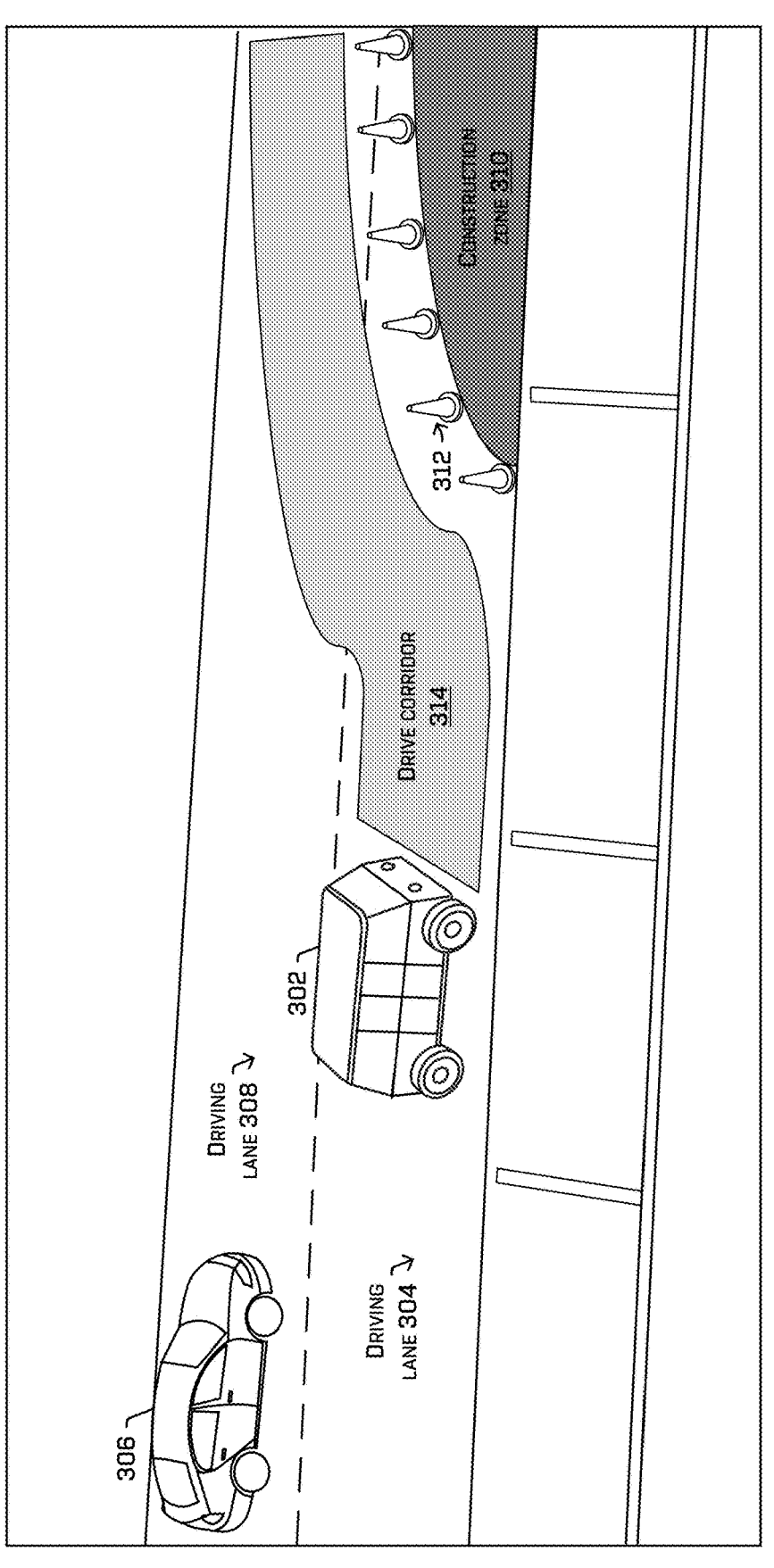
FIG. 3 illustrates an example environment including a vehicle approaching a construction zone, in accordance with one or more examples of the disclosure.

FIG. 3 illustrates an example environment 300 including a vehicle approaching a construction zone.

In this example, the example environment 300 may include a vehicle 302 navigating an environment. As shown, the vehicle 302 may be navigating in a driving lane 304. Further, the example environment 300 may include an object 306 that is navigating in a driving lane 308. As shown, the object 306 may be a vehicle; however, in other examples, the object 306 may be any other type of dynamic object (e.g., cyclist, motorcyclist, etc.). In this example, the vehicle 302 may be longitudinally in front of the object 306.

As shown, the example environment 300 may include a construction zone 310. In some examples, the vehicle 302 may include one or more sensor devices that are configured to capture sensor data of the environment proximate the vehicle 302. In such cases, the vehicle 302 may analyze the sensor data to detect objects. In this example, the vehicle 302 may detect construction cones 312 from the sensor data. As such, based on the sensor data, the vehicle 302 may determine that the vehicle 302 is approaching the construction zone 310. Based on identifying the construction zone 310, the vehicle 302 may generate actions for the vehicle to navigate around the construction zone 310. However, since the construction zone 310 may not be represented in the map data, the planning component of the vehicle 302 may believe that the vehicle 302 is attempting to perform a nominal lane change maneuver. As such, when determining the ROW scores, the vehicle 302 may determine that the changing lanes to the driving lane 308 may violate the ROW of the object. However, in forced merge scenarios in which two driving lanes combine into a single driving lane, the object 306 may be more willing to allow the vehicle 302 to enter the driving lane 308 in front of the object. As such, the vehicle 302 may generate a drive corridor 314 to enable the vehicle 302 to account for the construction zone 310 when planning future actions (and determining ROW scores).

For example, based on detecting the construction zone 310, the vehicle 302 can determine whether the driving lane 304 is blocked by the construction zone 310. As shown, the vehicle 302 may be unable to continue navigating in the driving lane 304 and as such, the driving lane 304 may be blocked by the construction zone 310. As such, the vehicle 302 may generate the drive corridor 314 which may represent a region of the environment that the vehicle 302 can follow around the construction zone 310. As shown, the drive corridor 314 may span the driving lane 304 and the driving lane 308. Though not shown, the vehicle 302 may use the drive corridor to generate a lane group that follows the drive corridor 314. In such cases, the vehicle 302 may use the lane group to determine how the vehicle 302 is to navigate around the construction zone 310.

Figure 4:
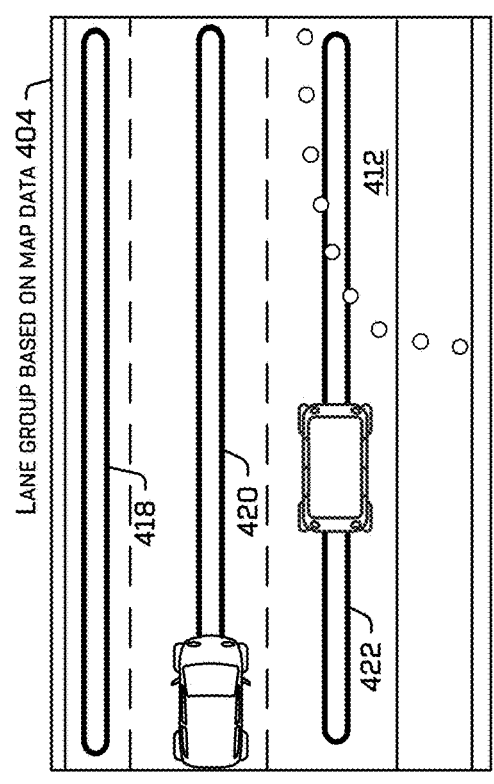
FIG. 4 is a pictorial diagram illustrating example techniques for combining multiple lane groups into a single heatmap, in accordance with one or more examples of the disclosure.
Figure 4:
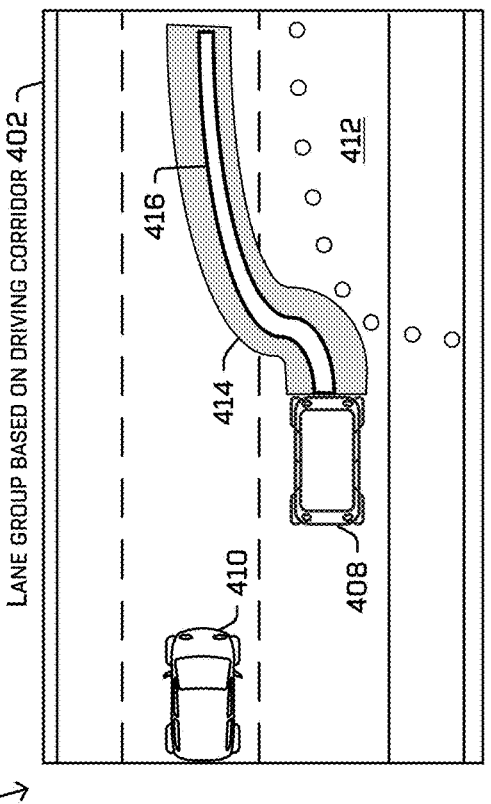
Figure 4:
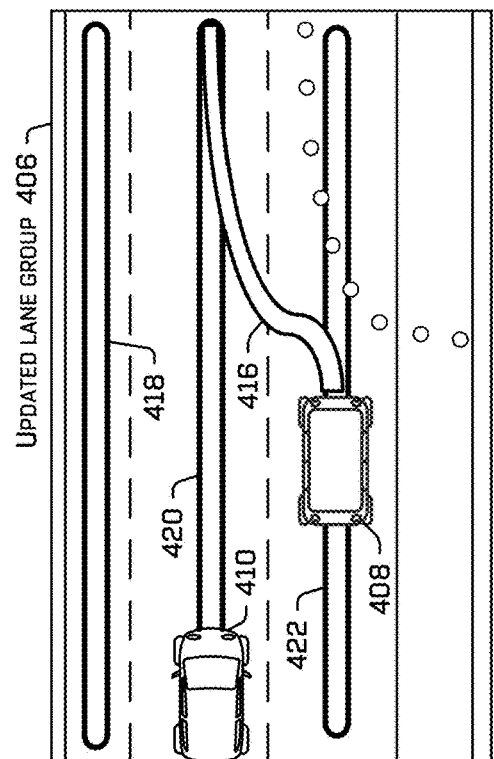

FIG. 4 is a pictorial flow diagram illustrating an example process 400 for combining multiple lane groups into a single heatmap. Specifically, FIG. 4 illustrates generating a single lane groups heatmap based on a lane group from a driving corridor and lane groups from map data.

In this example, the example process 400 may include generating multiple different lane groups. For example, the planning component may generate a lane group based on a driving corridor as shown in heatmap 402, a lane group based on map data as shown in heatmap 404, and/or an updated lane group as shown in heatmap 406.

In this example, the planning component may generate a lane group based on a driving corridor. For example, heatmap 402 may include a vehicle 408 and an object 410. Further, the heatmap 402 may include a representation of a construction zone 412 which may be similar or identical to the construction zones described above. Based on the construction zone blocking the driving lane occupied by the construction zone, the vehicle 408 may generate a driving corridor 414 which may represent a region of the environment that the vehicle 408 can follow around the construction zone 412. In this example, the planning component may generate a lane group 416 based on the driving corridor 414. As shown, the lane group 416 may include lane segments from multiple different driving lanes.

Further, the planning component may generate lane groups based on map data as shown in heatmap 404. The driving environment in heatmap 404 may be the same or similar as the environment in heatmap 402. In some examples, the planning component may receive map data and generate lane groups based on the lane segments stored therein. As noted above, a lane group may be a series of connected lane segments that do not require a lane change. For example, heatmap 404 illustrates a lane group 418, a lane group 420, and a lane group 422. As shown, the lane group 422 may represent the series of connected lane segments in the driving lane occupied by the vehicle 408. However, since the map data does not include information about the construction zone, the lane group 422 may continue straight through the construction zone 412. As such, the planning component may combine the heatmap 402 with the heatmap 404 to ensure that the vehicle 408 is able to evaluate candidate actions using an updated representation of the environment.

For example, the heatmap 406 may be an updated heatmap or an updated representation of the lane groups. The heatmap 406 may include the lane group 416 that was generated based on the construction zoned, as well as the lane groups generated based on the map data. In such cases, the planning component may use the updated lane group heatmap 406 when determining future actions of the vehicle 408.

Figure 5:
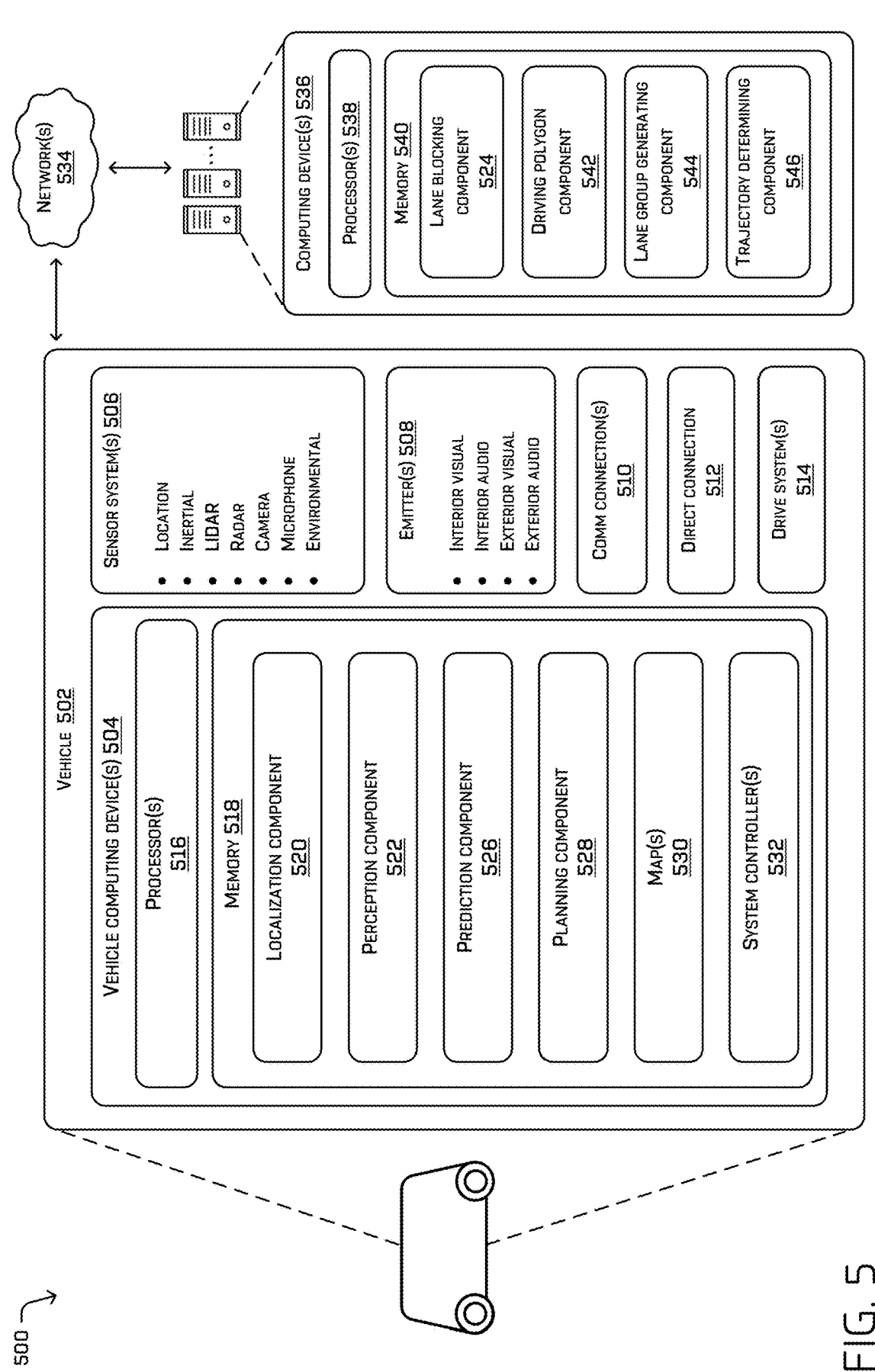
FIG. 5 depicts a block diagram of an example system for implementing various techniques described herein.

FIG. 5 is a block diagram of an example system 500 for implementing the techniques described herein. In at least one example, the system 500 may include a vehicle, such as vehicle 502. The vehicle 502 may include one or more vehicle computing devices 504, one or more sensor systems 506, one or more emitters 508, one or more communication connections 510, at least one direct connection 512, and one or more drive systems 514.

The vehicle computing device 504 may include one or more processors 516 and memory 518 communicatively coupled with the processor(s) 516. In the illustrated example, the vehicle 502 is an autonomous vehicle; however, the vehicle 502 could be any other type of vehicle, such as a semi-autonomous vehicle, or any other system having at least an image capture device (e.g., a camera-enabled smartphone). In some instances, the autonomous vehicle 502 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 502 may be a fully or partially autonomous vehicle having any other level or classification.

In the illustrated example, the memory 518 of the vehicle computing device 504 stores a localization component 520, a perception component 522, a prediction component 526, a planning component 528, one or more system controllers 532, and one or more maps 530 (or map data). Though depicted in FIG. 5 as residing in the memory 518 for illustrative purposes, it is contemplated that the localization component 520, the perception component 522, the prediction component 526, the planning component 528, system controller(s) 532, and/or the map(s) may additionally, or alternatively, be accessible to the vehicle 502 (e.g., stored on, or otherwise accessible by, memory remote from the vehicle 502, such as, for example, on memory 540 of one or more computing device 536 (e.g., a remote computing device)). In some examples, the memory 540 may include a lane blocking component 524, a driving polygon component 542, a lane group generating component 544, and a trajectory determining component 546.

In at least one example, the localization component 520 may include functionality to receive sensor data from the sensor system(s) 506 to determine a position and/or orientation of the vehicle 502 (e.g., one or more of an x-, y-, z-position, roll, pitch, or yaw). For example, the localization component 520 may include and/or request/receive a map of an environment, such as from map(s) 530, and may continuously determine a location and/or orientation of the vehicle 502 within the environment. In some instances, the localization component 520 may utilize SLAM (simultaneous localization and mapping), CLAMS (calibration, localization and mapping, simultaneously), relative SLAM, bundle adjustment, non-linear least squares optimization, or the like to receive image data, lidar data, radar data, inertial measurement unit (IMU) data, GPS data, wheel encoder data, and the like to accurately determine a location of the vehicle 502. In some instances, the localization component 520 may provide data to various components of the vehicle 502 to determine an initial position of the vehicle 502 for determining the relevance of an object to the vehicle 502, as discussed herein.

In some instances, the perception component 522 may include functionality to perform object detection, segmentation, and/or classification. In some examples, the perception component 522 may provide processed sensor data that indicates a presence of an object (e.g., entity) that is proximate to the vehicle 502 and/or a classification of the object as an object type (e.g., car, pedestrian, cyclist, animal, building, tree, road surface, curb, sidewalk, unknown, etc.). In some examples, the perception component 522 may provide processed sensor data that indicates a presence of a stationary entity that is proximate to the vehicle 502 and/or a classification of the stationary entity as a type (e.g., building, tree, road surface, curb, sidewalk, unknown, etc.). In additional or alternative examples, the perception component 522 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 526 may generate one or more probability maps representing prediction probabilities of possible locations of one or more objects in an environment. For example, the prediction component 526 may generate one or more probability maps for vehicles, pedestrians, animals, and the like within a threshold distance from the vehicle 502. In some instances, the prediction component 526 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

In some examples, the prediction component 526 may generate predicted trajectories of objects (e.g., objects) in an environment. For example, the prediction component 526 may generate one or more predicted trajectories for objects within a threshold distance from the vehicle 502. In some examples, the prediction component 526 may measure a trace of an object and generate a trajectory for the object based on observed and predicted behavior.

In general, the planning component 528 may determine a path for the vehicle 502 to follow to traverse through an environment. For example, the planning component 528 may determine various routes and trajectories and various levels of detail. For example, the planning component 528 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 528 may generate an instruction for guiding the vehicle 502 along at least a portion of the route from the first location to the second location. In at least one example, the planning component 528 may determine how to guide the vehicle 502 from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique. A single path of the multiple paths in a receding data horizon having the highest confidence level may be selected to operate the vehicle. In various examples, the planning component 528 may select a trajectory for the vehicle 502.

In other examples, the planning component 528 may alternatively, or additionally, use data from the localization component 520, the perception component 522, and/or the prediction component 526 to determine a path for the vehicle 502 to follow to traverse through an environment. For example, the planning component 528 may receive data (e.g., object data) from the localization component 520, the perception component 522, and/or the prediction component 526 regarding objects associated with an environment. In some examples, the planning component 528 receives data for relevant objects within the environment. Using this data, the planning component 528 may determine a route to travel from a first location (e.g., a current location) to a second location (e.g., a target location) to avoid objects in an environment. In at least some examples, such a planning component 528 may determine there is no such collision-free path and, in turn, provide a path that brings vehicle 502 to a safe stop avoiding all collisions and/or otherwise mitigating damage.

The planning component 528 may perform any of the techniques described with respect to any of FIGS. 1-4 above with respect to generating construction zone lane groups and controlling a vehicle based on such lane groups.

In at least one example, the vehicle computing device 504 may include one or more system controllers 532, which may be configured to control steering, propulsion, braking, safety, emitters, communication, and other systems of the vehicle 502. The system controller(s) 532 may communicate with and/or control corresponding systems of the drive system(s) 514 and/or other components of the vehicle 502.

The memory 518 may further include one or more maps 530 that may be used by the vehicle 502 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 502 may be controlled based at least in part on the map(s) 530. That is, the map(s) 530 may be used in connection with the localization component 520, the perception component 522, the prediction component 526, and/or the planning component 528 to determine a location of the vehicle 502, detect objects in an environment, generate routes, determine actions and/or trajectories to navigate within an environment.

In some examples, the one or more maps 530 may be stored on a remote computing device(s) (such as the computing device(s) 536) accessible via network(s) 534. In some examples, multiple maps 530 may be stored based on, for example, a characteristic (e.g., type of entity, time of day, day of week, season of the year, etc.). Storing multiple maps 530 may have similar memory requirements, but increase the speed at which data in a map may be accessed.

In some instances, aspects of some or all of the components discussed herein may include any models, techniques, and/or machine-learned techniques. For example, in some instances, the components in the memory 518 (and the memory 540, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As may be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet-50, ResNet-101, VGG, DenseNet, PointNet, Xception, ConvNeXt, and the like; visual transformer(s) (ViT(s)), such as a bidirectional encoder from image transformers (BEIT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. patent application Ser. No. 15/963,833, which is incorporated herein by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

In at least one example, the sensor system(s) 506 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 506 may include multiple instances of each of these or other types of sensors.

For instance, the lidar sensors may include individual lidar sensors located at the corners, front, back, sides, and/or top of the vehicle 502. As another example, the camera sensors may include multiple cameras disposed at various locations about the exterior and/or interior of the vehicle 502. The sensor system(s) 506 may provide input to the vehicle computing device 504. Additionally, or in the alternative, the sensor system(s) 506 may send sensor data, via the one or more networks 534, to the one or more computing device(s) 536 at a particular frequency, after a lapse of a predetermined period of time, in near real-time, etc.

The vehicle 502 may also include one or more emitters 508 for emitting light and/or sound. The emitter(s) 508 may include interior audio and visual emitters to communicate with passengers of the vehicle 502. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 508 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 502 may also include one or more communication connections 510 that enable communication between the vehicle 502 and one or more other local or remote computing device(s). For instance, the communication connection(s) 510 may facilitate communication with other local computing device(s) on the vehicle 502 and/or the drive system(s) 514. Also, the communication connection(s) 510 may allow the vehicle to communicate with other nearby computing device(s) (e.g., computing device 536, other nearby vehicles, etc.) and/or one or more remote sensor system(s) for receiving sensor data. The communications connection(s) 510 also enable the vehicle 502 to communicate with a remote teleoperations computing device or other remote services.

The communications connection(s) 510 may include physical and/or logical interfaces for connecting the vehicle computing device 504 to another computing device or a network, such as network(s) 534. For example, the communications connection(s) 510 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 502 may include one or more drive systems 514. In some examples, the vehicle 502 may have a single drive system 514. In at least one example, if the vehicle 502 has multiple drive systems 514, individual drive systems 514 may be positioned on opposite ends of the vehicle 502 (e.g., the front and the rear, etc.). In at least one example, the drive system(s) 514 may include one or more sensor systems to detect conditions of the drive system(s) 514 and/or the surroundings of the vehicle 502. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 514. In some cases, the sensor system(s) on the drive system(s) 514 may overlap or supplement corresponding systems of the vehicle 502 (e.g., sensor system(s) 506).

The drive system(s) 514 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 514. Furthermore, the drive system(s) 514 may also include one or more communication connection(s) that enable communication by the respective drive module with one or more other local or remote computing device(s).

In at least one example, the direct connection 512 may provide a physical interface to couple the one or more drive system(s) 514 with the body of the vehicle 502. For example, the direct connection 512 may allow the transfer of energy, fluids, air, data, etc. between the drive system(s) 514 and the vehicle. In some instances, the direct connection 512 may further releasably secure the drive system(s) 514 to the body of the vehicle 502.

In at least one example, the localization component 520, the perception component 522, the prediction component 526, the planning component 528, the one or more system controllers 532, and the one or more maps 530 may process sensor data, as described above, and may send their respective outputs, over the one or more network(s) 534, to the computing device(s) 536. In at least one example, the localization component 520, the perception component 522, the prediction component 526, the planning component 528, the one or more system controllers 532, and the one or more maps 530 may send their respective outputs to the computing device(s) 536 at a particular frequency, after a lapse of a predetermined period of time, in near real-time, etc.

In some examples, the vehicle 502 may send sensor data to the computing device(s) 536 via the network(s) 534. In some examples, the vehicle 502 may receive sensor data from the computing device(s) 536 and/or remote sensor system(s) via the network(s) 534. The sensor data may include raw sensor data and/or processed sensor data and/or representations of sensor data. In some examples, the sensor data (raw or processed) may be sent and/or received as one or more log files.

The computing device(s) 536 may include processor(s) 538 and a memory 540, which may include a lane blocking component 524, a driving polygon component 542, a lane group generating component 544, and a trajectory determining component 546. In some examples, the memory 540 may store one or more of components that are similar to the component(s) stored in the memory 518 of the vehicle 502. In such examples, the computing device(s) 536 may be configured to perform one or more of the processes described herein with respect to the vehicle 502. In some examples, the lane blocking component 524, the driving polygon component 542, the lane group generating component 544, and the trajectory determining component 546 may perform substantially similar functions as the planning component 528.

The processor(s) 516 of the vehicle 502 and the processor(s) 538 of the computing device(s) 536 may be any suitable processor capable of executing instructions to process data and perform operations as described herein. By way of example and not limitation, the processor(s) may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 518 and memory 540 are examples of non-transitory computer-readable media. The memory 518 and memory 540 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 5 is illustrated as a distributed system, in alternative examples, components of the vehicle 502 may be associated with the computing device(s) 536 and/or components of the computing device(s) 536 may be associated with the vehicle 502. That is, the vehicle 502 may perform one or more of the functions associated with the computing device(s) 536, and vice versa.

The methods described herein represent sequences of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes. In some examples, one or more operations of the method may be omitted entirely. For instance, the operations may include determining a first action and a second action by the vehicle relative to a selected trajectory without determining a respective cost for one or more of the actions by the vehicle. Moreover, the methods described herein may be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Figure 6:
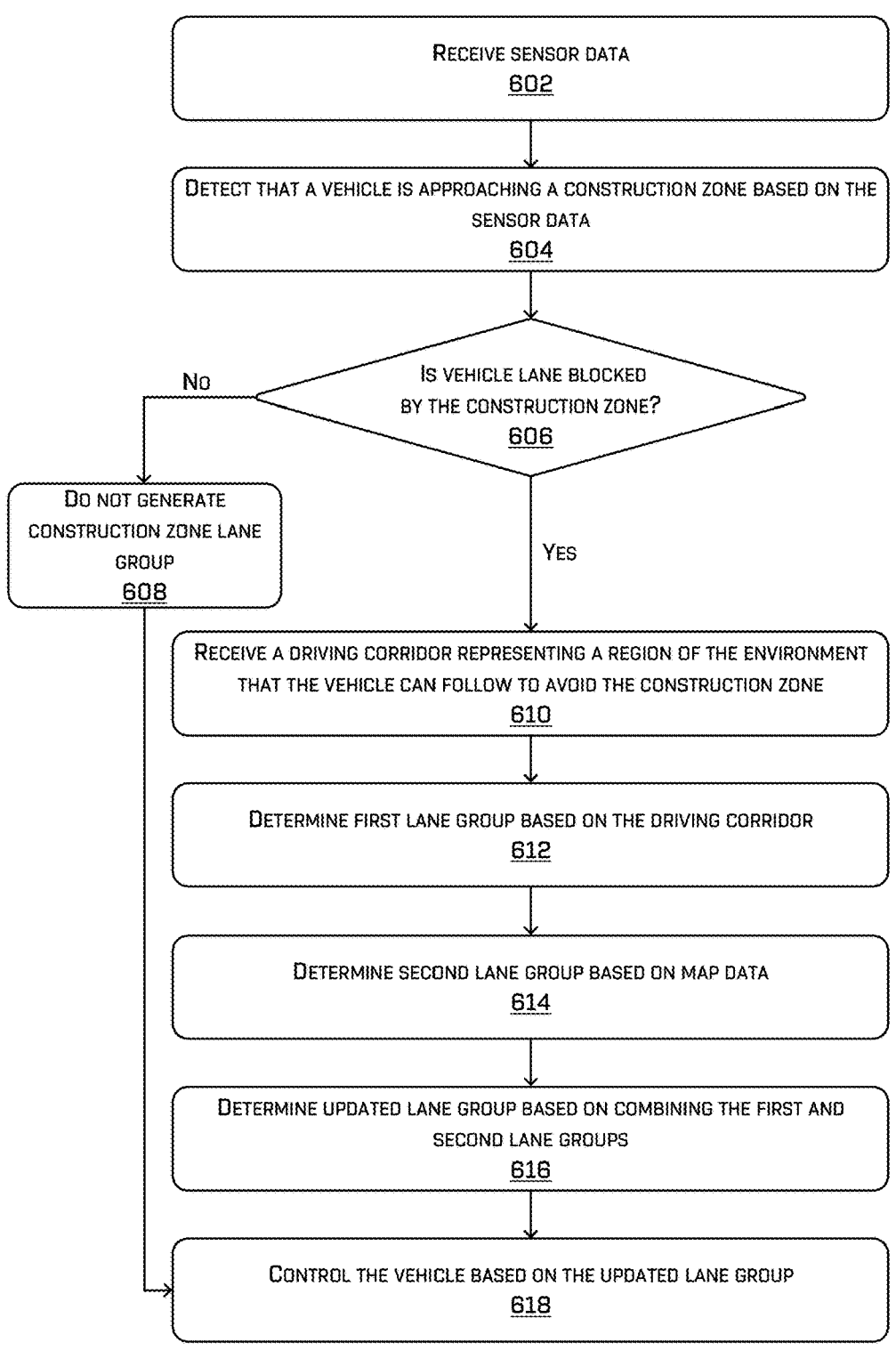
FIG. 6 is a flow diagram illustrating an example process for detecting and traversing around a construction zone in accordance with one or more examples of the disclosure.

FIG. 6 is a flow diagram illustrating an example process 600 for detecting a construction zone, determining that the construction zone is blocking the vehicle driving lane, generating a driving corridor based on the construction zone blocking the driving lane, generating lane groups based on the driving corridor, and controlling the vehicle based on the lane groups. As described below, the example process 600 may be performed by one or more computer computer-based components configured to implement various functionalities described herein. For instance, process 600 may be performed by a planning component 202. As described above, the planning component 202 may be integrated as an on-vehicle system. However, in other examples, the planning component 202 may be integrated as a separate server-based system.

Process 600 is illustrated as collections of blocks in a logical flow diagram, representing sequences of operations, some or all of which can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, encryption, deciphering, compressing, recording, data structures, and the like that perform particular functions or implement particular abstract data types. The order in which the operations are described should not be construed as a limitation. Any number of the described blocks can be combined in any order and/or in parallel to implement the processes, or alternative processes, and not all of the blocks need to be executed in all examples. For discussion purposes, the processes herein are described in reference to the frameworks, architectures and environments described in the examples herein, although the processes may be implemented in a wide variety of other frameworks, architectures or environments.

At operation 602, the planning component may receive sensor data. In some examples, the vehicle may include multiple sensor devices (e.g., lidar device(s), radar device(s), time-of-flight device(s), image capturing device(s), infrared device(s), etc.) configured to receive sensor data of the environment. Such sensor devices may be located at any location on or in the vehicle and may capture sensor data of any portion of the environment. In some examples, each sensor device may provide unique sensor data representative of the perspective of the particular sensor.

At operation 604, the planning component may detect that a vehicle is approaching a construction zone based on the sensor data. That is, in some situations, portions of a driving route may be undergoing construction. Such regions of the environment may be referred to as a construction zone. In some examples, the vehicle may identify a construction zone based on detecting construction cones, construction workers (e.g., pedestrians wearing certain types of clothing, pedestrians holding up traffic signs, etc.), etc. Alternatively or additionally, the planning component may identify the construction zone based on information from other vehicles within a fleet of vehicles (e.g., vehicles in the fleet can send information to other vehicles in the fleet, vehicles in the fleet may store data accessible to other vehicles in the fleet, etc.), a central server, a remote operation system (or remote teleoperator), etc.

At operation 606, the planning component may determine whether the vehicle driving lane is blocked by the construction zone. Based on detecting the construction zone, the vehicle may determine whether the construction zone is blocking the driving lane occupied by the vehicle. A construction zone may be blocking the driving lane if the vehicle is forced to change lanes to navigate around the construction zone. For example, the vehicle may generate, determine, or receive a construction zone contour which may be a bounded region that encompasses (or outlines) the construction zone. That is, the construction zone contour may define a region of the environment that is predicted to be associated with the construction zone. The vehicle can generate the construction zone contour by inputting the sensor data and/or map data into a machine-learned model trained to output the construction zone contour. For instance, the border of the construction zone contour may follow the construction cones located within the environment.

Based on generating the construction zone contour, the vehicle may determine whether the vehicle can pass on the left or right of the construction zone contour while staying in the current driving lane. That is, the current driving lane of the vehicle may be blocked if the vehicle is unable to navigate in the driving lane without entering a laterally adjacent driving lane. In contrast, the current driving lane of the vehicle may not be blocked if the vehicle is able to navigate in the driving lane without entering a laterally adjacent driving lane. In some examples, the planning component can determine if the vehicle can pass the construction zone by determining if a width of the vehicle meets or exceeds a distance from a side of the construction zone contour to a lane marker dividing the driving lanes. That is, the vehicle may identify a side of the construction zone contour within the driving lane, a lane marker of the current driving lane, and determine a distance between the side and the lane marker. Based on determining the distance, the vehicle can determine if the width of the vehicle is small enough such that the vehicle can fit (or otherwise navigate) within the current driving lane without entering a laterally adjacent driving lane. If the driving lane of the vehicle is not blocked (606: No), the planning component may determine not to generate construction zone lane groups. That is, at operation 608, the planning component may not generate a construction zone lane group.

In contrast, if the driving lane of the vehicle is blocked (606: Yes), the planning component may generate construction zone lane groups. That is, at operation 610, the planning component may receive a driving corridor representing a region of the environment that the vehicle can follow to avoid the construction zone. A driving corridor may be a refined drive space contour. A drive space contour may be a polygon, a bounded region, or a geometric region. The drive space contour may represent a region of the environment that the vehicle can follow to avoid the construction zone. In some examples, the vehicle may generate the drive space contour using a machine-learned model that is trained to output the drive space contour. In some examples, the vehicle can determine a drive space corridor by refining (or smoothing) the drive space contour. That is, in some instances, the driving space contour may be too large or too small. As such, the vehicle can refine the drive space contour by smoothing the borders such that the modified drive space contour (e.g., drive space corridor) is similar in width to a driving lane. The vehicle may generate the drive space corridor by identifying a side of the drive space contour and/or determining an offset distance from the side that is the width of the vehicle (plus a buffer). In such cases, the vehicle can generate a new side at the offset distance and use the new side and the initial side to create the drive space corridor.

At operation 612, the planning component may determine a first lane group based on the driving corridor. A lane group may be a series of connected lane segments that do not require a lane change. That is, a vehicle may generate lane groups (e.g., groups of lane segments) while the vehicle traverses the environment according to an operating tick of the planning component. That is, since the map data may lack data representing the construction zone, the planning component may generate a lane group specific to the construction zone. For example, the planning component may generate a lane group that follows the drive space corridor around the construction zone. As such, the lane group based on the drive space corridor may include lane segments from multiple different driving lanes. In such cases, the lane group may extend from the location of the vehicle to an ending location of the construction zone. The planning component may convert or otherwise associate the lane group with a second heatmap that is different than the first heatmap as generated based on the map data.

At operation 614, the planning component may determine a second lane group based on map data. That is, the planning component may identify one or more lane groups (e.g., groups of lane segments that lack a lane change) within the map data. Based on identifying the lane groups, the planning component may associate the lane groups with a first heatmap.

At operation 616, the planning component may determine an updated lane group based on combining the first and second lane groups. Accordingly, the planning component may generate an updated or combined heatmap (or lane group) by combining the second heatmap (or lane groups based on map data) with the first heatmap (or lane group based on the drive corridor). In such cases, the updated heatmap or updated lane group may be a single heatmap or a single updated lane group that includes the lane groups from the map data and from the drive space corridor.

At operation 618, the planning component may control the vehicle based on the updated lane group. That is, the planning component may include one or more subcomponents that may use the updated heatmap to determine actions for the vehicle. Specifically, the updated heatmap may cause the planning component to evaluate the driving scenario as a forced merge scenario rather than a traditional lane change scenario. In such cases, a ROW component of the planning component may use the updated heatmap when determining the ROW scores for the vehicle and/or objects proximate the vehicle. As such, when determining the ROW scores, the ROW component may view the scenario as two driving lanes merging to occupy the same physical space which may trigger the forced merge logic (or techniques). Further, when determining the ROW scores, the ROW component (or planning component) can modify the weights assigned to or otherwise associated with a specific lane group. That is, every lane group can have a type (e.g., construction zone, nominal, turning, etc.). As such, the ROW component can modify the weight of the construction zone lane group such that the weight is higher than the weight of the other types of lane groups. Increasing the weight of the construction zone lane group may increase the ROW score of the vehicle (e.g., indicate that the vehicle has higher ROW) and decrease the ROW score of the object in the laterally adjacent driving lane. Such a modification may encourage the vehicle to merge safely prior to the construction zone.

EXAMPLE CLAUSES

A: A system comprising: one or more processors; and one or more non-transitory computer-readable media storing computer-executable instructions that, when executed, cause the system to perform operations comprising: receiving, from a sensor associated with a vehicle, sensor data representative of an environment; detecting, based at least in part on the sensor data, that a driving lane in which the vehicle is currently traversing is associated with a portion that is restricted for driving; receiving, based at least in part on the driving lane being restricted, a driving corridor that represents a region of the environment available for the vehicle to traverse to avoid the portion that is restricted for driving; determining a path associated with the driving corridor; determining, based at least in part on map data, a group of lane segments that is different than the path; determining, based at least in part on the path and the group of lane segments, an updated group of lane segments; and controlling the vehicle based at least in part on the updated group of lane segments.

B: The system of paragraph A, wherein the portion is a restricted area, wherein determining that the driving lane is restricted is based at least in part on: generating, based at least in part on the sensor data and a machine-learned model, a zone contour that outlines the restricted area; and determining, based at least in part on the zone contour and the map data, that the driving lane is restricted.

C: The system of paragraph B, wherein determining that the driving lane is restricted is based at least in part on: determining, based at least in part on the map data, a distance from a side of a zone contour associated with the restricted area to a lane marker defining a border of the driving lane; determining that a width of the vehicle meets or exceeds the distance; and determining, based at least in part on the width meeting or exceeding the distance, that the driving lane is restricted.

D: The system of paragraph A, wherein the portion is a restricted area, wherein determining the driving corridor is based at least in part on: generating a polygon representing the region of the environment available for the vehicle to traverse to avoid the restricted area; and generating, as the driving corridor and based at least in part on a width of the vehicle, a modified polygon that includes a different width than the polygon.

E: The system of paragraph A, wherein controlling the vehicle is based at least in part on: determining that the updated group of lane segments includes a merging scenario between the driving lane and a laterally spaced driving lane; detecting an object in the laterally spaced driving lane; determining, based at least in part on the updated group of lane segments, a first type of lane segment associated with the laterally spaced driving lane, the first type of lane segment being associated with a first weight; determining a second weight of a second type of the path associated with the driving corridor, wherein the second weight is higher than the first weight; determining, based at least in part on the first weight and the second weight, a right-of-way score associated with the object; and causing, based at least in part on the right-of-way score, the vehicle to enter a merged driving lane in front of the object.

F: One or more non-transitory computer-readable media storing instructions executable by one or more processors, wherein the instructions, when executed, cause a system to perform operations comprising: receiving sensor data representative of an environment; detecting, based at least in part on the sensor data, that a vehicle is approaching a restricted area; receiving, based at least in part on the restricted area, a driving corridor that represents a region of the environment available for the vehicle to traverse to avoid the restricted area; determining a path associated with the driving corridor; determining, based at least in part on map data, a group of lane segments that is different than the path; and determining, based at least in part on the path and the group of lane segments, an updated group of lane segments.

G: The one or more non-transitory computer-readable media of paragraph F, wherein receiving the driving corridor is based at least in part on: determining that a driving lane occupied by the vehicle is restricted by the restricted area.

H: The one or more non-transitory computer-readable media of paragraph G, wherein determining that the driving lane is restricted is based at least in part on: generating, based at least in part on a machine-learned model, a zone contour that outlines the restricted area; and determining, based at least in part on the zone contour and the map data, that the driving lane is restricted.

I: The one or more non-transitory computer-readable media of paragraph H, wherein determining that the driving lane is restricted is based at least in part on: determining, based at least in part on the map data, a distance from a side of a zone contour associated with the restricted area to a lane marker defining a border of the driving lane; determining that a width of the vehicle meets or exceeds the distance; and determining, based at least in part on the width meeting or exceeding the distance, that the driving lane is restricted.

J: The one or more non-transitory computer-readable media of paragraph F, wherein determining the driving corridor is based at least in part on: generating a polygon representing the region of the environment available for the vehicle to traverse to avoid the restricted area; and generating, as the driving corridor and based at least in part on a width of the vehicle, a modified polygon that includes a different width than the polygon.

K: The one or more non-transitory computer-readable media of paragraph F, wherein the group of lane segments comprises one or more connected lane segments that lack lane changes, and wherein the path is associated with multiple driving lanes.

L: The one or more non-transitory computer-readable media of paragraph F, the operations further comprising: controlling the vehicle based at least in part on the updated group of lane segments.

M: The one or more non-transitory computer-readable media of paragraph L, wherein controlling the vehicle is based at least in part on: determining that the updated group of lane segments includes a merging scenario between a driving lane of the vehicle and a laterally spaced driving lane; detecting an object in the laterally spaced driving lane; determining, based at least in part on the updated group of lane segments, a first type of lane segment associated with the laterally spaced driving lane, the first type of lane segment being associated with a first weight; determining a second weight of a second type of path associated with the driving corridor, wherein the second weight is higher than the first weight; determining, based at least in part on the first weight and the second weight, a right-of-way score associated with the object; and causing, based at least in part on the right-of-way score, the vehicle to enter a merged driving lane in front of the object.

N: A method comprising: receiving sensor data representative of an environment; detecting, based at least in part on the sensor data, that a vehicle is approaching a restricted area; receiving, based at least in part on the restricted area, a driving corridor that represents a region of the environment available for the vehicle to traverse to avoid the restricted area; determining a path associated with the driving corridor; determining, based at least in part on map data, a group of lane segments that is different than the path; and determining, based at least in part on the path and the group of lane segments, an updated group of lane segments.

O: The method of paragraph N, wherein receiving the driving corridor is based at least in part on: determining that a driving lane occupied by the vehicle is restricted by the restricted area.

P: The method of paragraph O, wherein determining that the driving lane is restricted is based at least in part on: generating, based at least in part on a machine-learned model, a zone contour that outlines the restricted area; and determining, based at least in part on the zone contour and the map data, that the driving lane is restricted.

Q: The method of paragraph P, wherein determining that the driving lane is restricted is based at least in part on: determining, based at least in part on the map data, a distance from a side of a zone contour associated with the restricted area to a lane marker defining a border of the driving lane; determining that a width of the vehicle meets or exceeds the distance; and determining, based at least in part on the width meeting or exceeding the distance, that the driving lane is restricted.

R: The method of paragraph N, wherein determining the driving corridor is based at least in part on: generating a polygon representing the region of the environment available for the vehicle to traverse to avoid the restricted area; and generating, as the driving corridor and based at least in part on a width of the vehicle, a modified polygon that includes a different width than the polygon.

S: The method of paragraph N, wherein the group of lane segments comprises one or more connected lane segments that lack lane changes, and wherein the path is associated with multiple driving lanes.

T: The method of paragraph S, wherein controlling the vehicle is based at least in part on: determining that the updated group of lane segments includes a merging scenario between a driving lane of the vehicle and a laterally spaced driving lane; detecting an object in the laterally spaced driving lane; determining, based at least in part on the updated group of lane segments, a first type of lane segment associated with the laterally spaced driving lane, the first type of lane segment being associated with a first weight; determining a second weight of a second type of path associated with the driving corridor, wherein the second weight is higher than the first weight; determining, based at least in part on the first weight and the second weight, a right-of-way score associated with the object; and causing, based at least in part on the right-of-way score, the vehicle to enter a merged driving lane in front of the object.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
one or more non-transitory computer-readable media storing computer-executable instructions that, when executed, cause the system to perform operations comprising:
receiving, from a sensor associated with an autonomous vehicle, sensor data representative of an environment;
detecting, based at least in part on the sensor data, that a driving lane in which the autonomous vehicle is currently traversing is associated with a portion that is restricted for driving;
receiving, based at least in part on the driving lane being restricted, a driving corridor that represents a region of the environment available for the autonomous vehicle to traverse to avoid the portion that is restricted for driving;
determining a path associated with the driving corridor;
determining, based at least in part on map data, a group of lane segments that is different than the path;
determining, based at least in part on adding the path to the group of lane segments, an updated group of lane segments; and
controlling movement of the autonomous vehicle based at least in part on the updated group of lane segments.

2. The system of claim 1, wherein the portion is a restricted area, wherein determining that the driving lane is restricted is based at least in part on:
generating, based at least in part on the sensor data and a machine-learned model, a zone contour that outlines the restricted area; and
determining, based at least in part on the zone contour and the map data, that the driving lane is restricted.

3. The system of claim 2, wherein determining that the driving lane is restricted is based at least in part on:
determining, based at least in part on the map data, a distance from a side of the zone contour that outlines the restricted area to a lane marker defining a border of the driving lane;
determining that a width of the autonomous vehicle meets or exceeds the distance; and
determining, based at least in part on the width meeting or exceeding the distance, that the driving lane is restricted.

4. The system of claim 1, wherein the portion is a restricted area, wherein determining the driving corridor is based at least in part on:
generating a polygon representing the region of the environment available for the autonomous vehicle to traverse to avoid the restricted area; and
generating, as the driving corridor and based at least in part on a width of the autonomous vehicle, a modified polygon that includes a different width than the polygon.

5. The system of claim 1, wherein the controlling the autonomous vehicle is based at least in part on:
determining that the updated group of lane segments includes a merging scenario between the driving lane and a laterally spaced driving lane;
detecting an object in the laterally spaced driving lane;
determining, based at least in part on the updated group of lane segments, a first type of lane segment associated with the laterally spaced driving lane, the first type of lane segment being associated with a first weight;
determining a second weight of a second type of the path associated with the driving corridor, wherein the second weight is higher than the first weight;
determining, based at least in part on the first weight and the second weight, a right-of-way score associated with the object; and
causing, based at least in part on the right-of-way score, the autonomous vehicle to enter a merged driving lane in front of the object.

6. The system of claim 1, wherein the group of lane segments comprises one or more connected lane segments that lack lane changes, and wherein the path is associated with multiple driving lanes.

7. One or more non-transitory computer-readable media storing instructions executable by one or more processors, wherein the instructions, when executed, cause a system to perform operations comprising:
receiving sensor data representative of an environment;
detecting, based at least in part on the sensor data, that an autonomous vehicle is approaching a restricted area;
receiving, based at least in part on the restricted area, a driving corridor that represents a region of the environment available for the autonomous vehicle to traverse to avoid the restricted area;
determining a path associated with the driving corridor;
determining, based at least in part on map data, a group of lane segments that is different than the path;
determining, based at least in part on adding the path to the group of lane segments, an updated group of lane segments; and
controlling movement of the autonomous vehicle based at least in part on the updated group of lane segments.

8. The one or more non-transitory computer-readable media of claim 7, wherein receiving the driving corridor is based at least in part on:

determining that a driving lane occupied by the autonomous vehicle is restricted by the restricted area.

9. The one or more non-transitory computer-readable media of claim 8, wherein determining that the driving lane is restricted is based at least in part on:

generating, based at least in part on a machine-learned model, a zone contour that outlines the restricted area; and determining, based at least in part on the zone contour and the map data, that the driving lane is restricted.

10. The one or more non-transitory computer-readable media of claim 9, wherein determining that the driving lane is restricted is based at least in part on:

determining, based at least in part on the map data, a distance from a side of the zone contour that outlines the restricted area to a lane marker defining a border of the driving lane;

determining that a width of the autonomous vehicle meets or exceeds the distance; and determining, based at least in part on the width meeting or exceeding the distance, that the driving lane is restricted.

11. The one or more non-transitory computer-readable media of claim 7, wherein determining the driving corridor is based at least in part on:

generating a polygon representing the region of the environment available for the autonomous vehicle to traverse to avoid the restricted area; and generating, as the driving corridor and based at least in part on a width of the autonomous vehicle, a modified polygon that includes a different width than the polygon.

12. The one or more non-transitory computer-readable media of claim 7, wherein the group of lane segments comprises one or more connected lane segments that lack lane changes, and wherein the path is associated with multiple driving lanes.

13. The one or more non-transitory computer-readable media of claim 7, wherein the controlling the autonomous vehicle is based at least in part on:

determining that the updated group of lane segments includes a merging scenario between a driving lane of the autonomous vehicle and a laterally spaced driving lane;

detecting an object in the laterally spaced driving lane;

determining, based at least in part on the updated group of lane segments, a first type of lane segment associated with the laterally spaced driving lane, the first type of lane segment being associated with a first weight;

determining a second weight of a second type of path associated with the driving corridor, wherein the second weight is higher than the first weight;

determining, based at least in part on the first weight and the second weight, a right-of-way score associated with the object; and causing, based at least in part on the right-of-way score, the autonomous vehicle to enter a merged driving lane in front of the object.

14. A method comprising:

receiving sensor data representative of an environment;

detecting, based at least in part on the sensor data, that an autonomous vehicle is approaching a restricted area;

receiving, based at least in part on the restricted area, a driving corridor that represents a region of the environment available for the autonomous vehicle to traverse to avoid the restricted area;

determining a path associated with the driving corridor;

determining, based at least in part on map data, a group of lane segments that is different than the path;

determining, based at least in part on adding the path to the group of lane segments, an updated group of lane segments; and controlling movement of the autonomous vehicle based at least in part on the updated group of lane segments.

15. The method of claim 14, wherein receiving the driving corridor is based at least in part on:

determining that a driving lane occupied by the autonomous vehicle is restricted by the restricted area.

16. The method of claim 15, wherein determining that the driving lane is restricted is based at least in part on:

generating, based at least in part on a machine-learned model, a zone contour that outlines the restricted area; and determining, based at least in part on the zone contour and the map data, that the driving lane is restricted.

17. The method of claim 16, wherein determining that the driving lane is restricted is based at least in part on:

determining, based at least in part on the map data, a distance from a side of the zone contour that outlines the restricted area to a lane marker defining a border of the driving lane;

determining that a width of the autonomous vehicle meets or exceeds the distance; and determining, based at least in part on the width meeting or exceeding the distance, that the driving lane is restricted.

18. The method of claim 14, wherein determining the driving corridor is based at least in part on:

generating a polygon representing the region of the environment available for the autonomous vehicle to traverse to avoid the restricted area; and generating, as the driving corridor and based at least in part on a width of the autonomous vehicle, a modified polygon that includes a different width than the polygon.

19. The method of claim 14, wherein the group of lane segments comprises one or more connected lane segments that lack lane changes, and wherein the path is associated with multiple driving lanes.

20. The method of claim 19, wherein the controlling the autonomous vehicle is based at least in part on:

determining that the updated group of lane segments includes a merging scenario between a driving lane of the autonomous vehicle and a laterally spaced driving lane;

detecting an object in the laterally spaced driving lane;

determining, based at least in part on the updated group of lane segments, a first type of lane segment associated with the laterally spaced driving lane, the first type of lane segment being associated with a first weight;

determining a second weight of a second type of path associated with the driving corridor, wherein the second weight is higher than the first weight;

determining, based at least in part on the first weight and the second weight, a right-of-way score associated with the object; and causing, based at least in part on the right-of-way score, the autonomous vehicle to enter a merged driving lane in front of the object.

* * * * *